Sept. 24, 1968     D. DAVIDOFF     3,403,310
TRIGGER CIRCUIT HAVING ADJUSTABLE UPPER AND LOWER
VOLTAGE TRIGGER LIMITS TO CONTROL A
SERVOMOTOR IN FORWARD AND
REVERSE DRIVE
Filed April 5, 1965
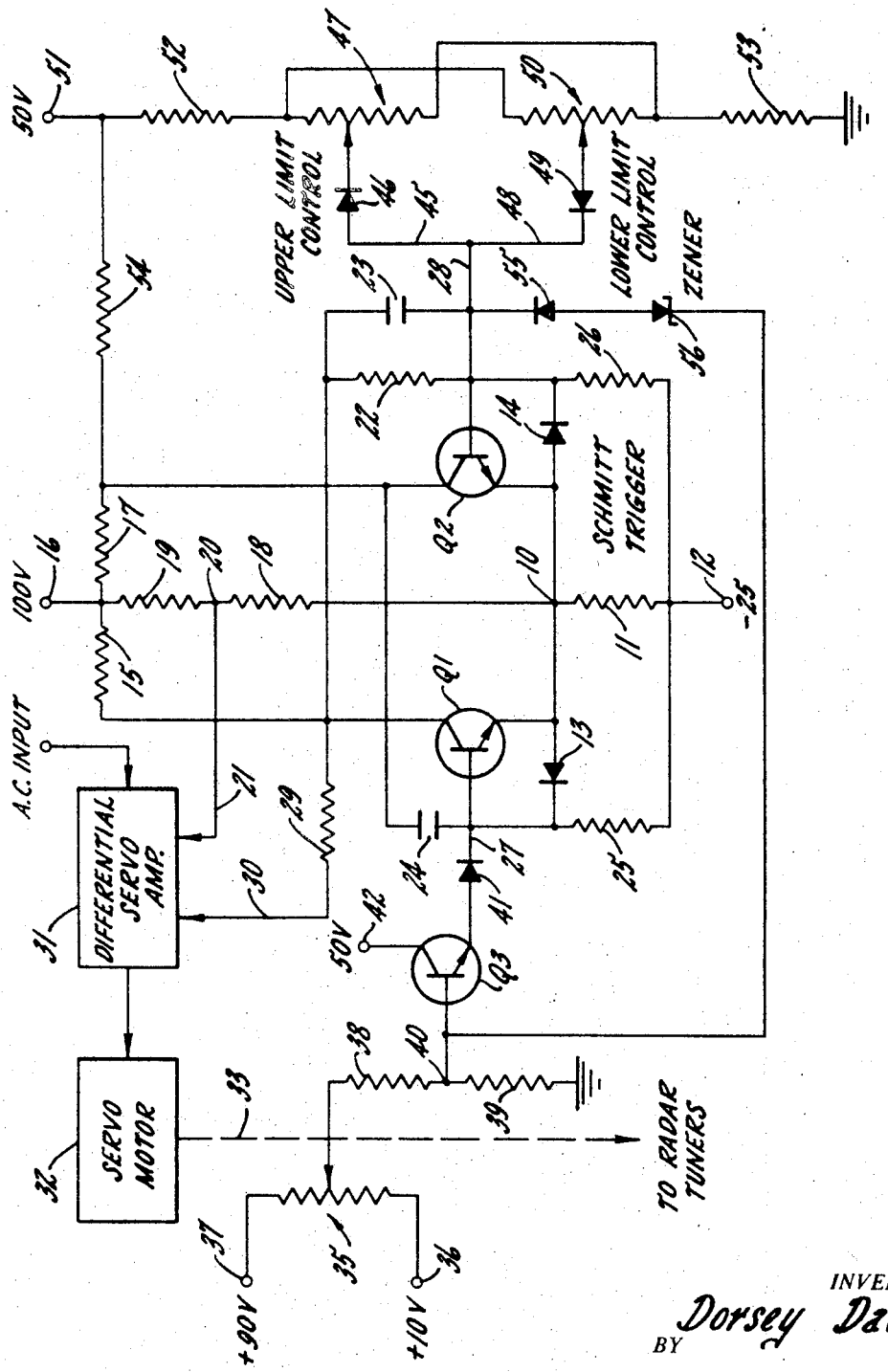
INVENTOR.
Dorsey Davidoff,
BY
H. H. Losche
Att'ys.

United States Patent Office 3,403,310
Patented Sept. 24, 1968

3,403,310
TRIGGER CIRCUIT HAVING ADJUSTABLE UPPER AND LOWER VOLTAGE TRIGGER LIMITS TO CONTROL A SERVOMOTOR IN FORWARD AND REVERSE DRIVE
Dorsey Davidoff, Fort Lee, N.J., assignor, by mesne assignments, to the United States of America as represented by the Secretary of the Navy
Filed Apr. 5, 1965, Ser. No. 445,806
9 Claims. (Cl. 318—18)

ABSTRACT OF THE DISCLOSURE

A variable hysteresis trigger circuit having a high adjustable voltage limit input and a low adjustable voltage limit input thereto and a single output producing a high voltage for one triggered condition and a low voltage for another triggered condition, said output being operative to control a servo motive means which drives a variable resistance device as well as a load with the output of the variable resistance device being fed back to the trigger circuit to produce triggering thereof when each adjusted high or low voltage limit is reached thereby producing reversed servomotor oscillations between driving limits.

Background of the invention

This invention relates to variable hysteresis trigger circuits and more particularly to a circuit similar to a Schmitt trigger circuit which will trigger when a varying voltage on one of its inputs crosses an upper or lower voltage limit on a second input thereof to produce a high voltage and a low voltage, respectively, on an output as the voltage limits are crossed to control a servo driving system in forward and reverse driving operations.

There are known circuits devised for modulating an alternating current voltage in positive amplitudes and negative amplitudes to operate a servo driving motor through a servo amplifier in forward and reverse directions. These modulating means may take several forms by switching the output to the servo amplifier when certain voltages or limits are reached to cause the servo motor to operate in an oscillatory manner of driving forward and backward to drive, for example, the tuning circuits of a radar or the antenna of a radar or any other device where an oscillatory motion of this type is required. Many of these devices are controlled in their limits of drive by the use of electrical limiting switches on the driven device to feed back these limiting voltages or to break the circuit and recycle the circuit to start the servo motor in the opposite direction. The disadvantages of prior known devices particularly using limit switches are cumbersome and have a fairly high failure rate. It is more desirable to have a solid state circuit capable of producing the voltage limiting or servo drive limiting functions in an amplified scan limiting circuit.

Summary of the invention

In the present invention a scan limiting circuit is devised utilizing solid state emission devices, such as transistors, in a trigger circuit which closely resembles a Schmitt trigger circuit. This Schmitt trigger circuit has two control voltage inputs and a single output to produce high and low voltages in its alternate triggered state with respect to a reference voltage to operate through a differential servo amplifier to control the servo motor in its forward and backward rotational direction. The servo motor, while driving tuners of the radar or the radar antenna or the like, likewise drives a follower potentiometer, the voltage tap output of which is applied as one input to the trigger circuit in its driven operation from high to low voltages. The other input to the trigger circuit is from a high and low voltage limiting network which, when matched in voltage with the input from the follower potentiometer, will cause the trigger circuit to switch producing the high and low voltage conditions on the output of the trigger circuit. In this manner the scan limiting circuit will cause the servo motor to drive its connected equipment in forward and reverse oscillations over a precise and accurate oscillatory path. It is therefore a general object of this invention to provide a trigger circuit for producing two states of conduction on an output with a high voltage and a low voltage for each state triggered in a corresponding manner as an input voltage from a follower potentiometer crosses a high voltage limit and a low voltage limit, respectively, to drive a servo motor system in rotative oscillation.

Brief description of the drawing

These and other objects and the attendant advantages, features, and uses will become more apparent as a more detailed description proceeds when considered along with the accompanying single drawing illustrating the scan limit circuit schematically with portions thereof in block.

Description of the preferred embodiment

Referring more particularly to the single figure of drawing, a trigger circuit, resembling a Schmitt trigger, consists of a pair of NPN type transistors Q1 and Q2 having their emitters coupled in common to a terminal point 10 which terminal point 10 is connected through an emitter load resistor 11 to a negative voltage source 12. Each emitter is coupled through diodes 13 and 14, respectively, in the low resistance direction to its own base. The diodes 13 and 14 prevent the respective transistors Q1 and Q2 from having emitter voltages higher than their respective bases. The collector of transistor Q1 is coupled through a collector load resistor 15 to a positive voltage source 16 while the collector of transistor Q2 has its collector coupled through a collector load resistor 17 to the voltage source 16. The terminal point 10 is coupled likewise in series through a voltage divider circuit of resistors 18 and 19 to the positive voltage source 16, the junction 20 of this voltage divider producing a reference voltage output 21. The collector of transistor Q1 is coupled in parallel through a resistor 22 and a capacitor 23 to the base of transistor Q2 while the collector of transistor Q2 is coupled to the base of transistor Q1 through a capacitor 24. The base of transistor Q1 is biased from the negative voltage source 12 through a resistor 25 and the base of transistor Q2 is biased from the negative voltage source 12 through a resistor 26. This circuit constitutes a trigger circuit quite similar to a Schmitt trigger circuit having one input to the base of transistor Q1 by way of conductor means 27, a second input to the base of transistor Q2 by way of conductor means 28, and an output taken from the collector of transistor Q1 through a resistor 29 to the output conductor 30.

The output 30 of the trigger circuit is coupled to a differential servo amplifier 31, as is also the reference voltage produced on the conductor 21. The output of the differential servo amplifier 31 is coupled to control a servo motor 32 having a shaft 33 for mechanically driving the radar tuners or antenna in a radar system in which this circuit may be used. The driving shaft 33 of the servo motor is also mechanically coupled to drive the adjustable tap of a potentiometer 35, the resistance element of which is coupled between two voltage potentials, herein shown to be a positive 10 volt source at the terminal 36 and a positive 90 volt source at terminal 37. The servo motor is made to drive the adjustable tap of the potentiometer 35 upward and downward along the resistance element of the potentiometer from a voltage approaching 10 volts to a voltage approaching 90 volts, as will become clear with further description. The adjustable tap of the potentiometer 35 is coupled through two resistors 38 and 39 in series and of equal value to a fixed potential such as ground. The two equal resistors 38 and 39 are of a value, as will later be disclosed, to divide the voltage picked off by the adjustable tap of potentiometer 35 in half at a terminal junction 40 between the resistors 38 and 39. The terminal point 40 is directly coupled to the base of an emitter follower transistor Q3, the emitter follower being coupled through a diode 41 in the low resistance direction to the input 27 of the trigger circuit. The collector of transistor Q3 is directly coupled to a positive voltage source at terminal 42, this voltage source being illustrated herein as 50 volts for the purpose of example and operation to be given hereinbelow.

The other input 28 to the trigger circuit is coupled in common to an upper limit control and a lower limit control of a voltage limiting network. The input 28 is coupled by way of a conductor means 45 to the anode of a diode 46, the cathode of which is coupled to the adjustable tap of an upper limit potentiometer 47. The input 28 is also coupled by way of a branch conductor 48 to the cathode of a diode 49, the anode of which is coupled to the adjustable tap of a low limit potentiometer 50. The resistance elements of potentiometers 47 and 50 are coupled in parallel across a voltage source having its positive terminal at 51 and its negative terminal to the fixed or ground potential. Resistance elements 52 and 53 are in series with the parallel coupled potentiometers 47 and 50. The positive voltage source at terminal 51 is shown herein to be 50 volts, for the purpose of example, and this terminal point 51 is coupled through a resistor 54 to the terminal 16 through resistor 17. The input 28 to the trigger circuit is also coupled to the base of emitter follower transistor Q3 through a diode 55 and a Zener diode 56. The diode 55 is oriented with its cathode coupled to the input 28 and its anode coupled to the anode of the Zener diode 56. The diode 55 prevents any current flow from the input 28 to the base of transistor Q3 and the Zener diode 56 prevents the emitter follower input voltage from rising more than a predetermined amount above the upper limit established by the potentiometer 47 so that the transistor Q2 maximum reverse base-to-emitter voltage rating will not be exceeded.

*Operation*

For the purpose of example in describing the operation of the scan limiting circuit, values will be given to the various elements and components to provide an operative example although other elements having different values may be used to provide more specific applications without departing from this invention. The following values are given for the purpose of example only:

| Resistors: | Values |
|---|---|
| 11 | 4.7K |
| 15 | 22K |
| 17 and 54 | 2.7K |
| 18 and 29 | 10K |
| 19, 25, and 26 | 100K |
| 22, 38, and 39 | 47K |
| 52 and 53 ohms | 300 |
| Potentiometers: | |
| 35 | 10K |
| 47 and 50 | 5K |
| Capacitors 23 and 24 μμf | 390 |
| Diodes—All diodes are 1N660 except the Zener. | |
| Zener diode 56 volts | 8 |
| Transistors: | |
| Q1 and Q2 | 2N657 |
| Q3 | 2N336 |

In the operation of this circuit let it be assumed that transistor Q1 is conducting whereby a voltage on the output 30 will be lower than the reference voltage on the output 21. With the voltage values shown this output voltage on conductor 30 should be about 7 volts below the reference voltage on the output 21. Under this condition the differential servo amplifier 31 should control the servo motor 32 to drive the adjustable tap of the potentiometer 35 downwardly or toward the lower voltage of 10 volts. The voltage picked off by the adjustable tap of the potentiometer 35 should be divided in half at terminal 40 and this voltage applied to the base of transistor Q1 will be followed on its emitter through the diode 41 to the base of transistor Q1 in the trigger circuit. This voltage on the base of transistor Q1 will appear on the emitter thereof to gradually decrease the voltage at terminal point 10 across the resistor 11. Since the transistor Q1 is conducting, the collector voltage of transistor Q1 is applied through the resistor 22 to the base of transistor Q2 and since this voltage is low by virtue of the voltage drop across the collector load resistor 15, transistor Q2 will be held in a nonconductive state. While the collector voltage of transistor Q1 across the resistor 22 attempts to lower the voltage on the base of transistor Q2, the base voltage of transistor Q2 can go no lower than the limit set by the low limit control of potentiometer 50. For example, let it be assumed that the low voltage control is set to apply 6 volts to the base of transistor Q2. As the adjustable tap of potentiometer 35 is driven downwards and this voltage is followed through the emitters of transistors Q3 and Q1 to the terminal point 10 to drive this terminal point 10 downward, transistor Q2 will trigger into conduction when the terminal point 10 attempts to go below this 6 volt limit. When conduction begins in transistor Q2, transistor Q1 will be cut off by virtue of the collector of transistor Q2 being coupled through the capacitor 24 to the base of transistor Q1. Cutoff of transistor Q1 will cause its collector voltage to rise immediately which voltage on the output 30 now will be greater than the reference voltage applied by way of terminal 21 to cause the differential amplifier 31 to immediately reverse servo motor 32 to drive the adjustable tap of potentiometer 35 upwardly. The high voltage on the collector of transistor Q1 will be applied through resistor 22 to the base of transistor Q2 but this base voltage cannot go any higher than the upper voltage limit set by the adjustable tap of potentiometer 47. Let it be assumed for the purpose of example that the high voltage limit from the potentiometer 47 is set at 44 volts. At this time the input emitter follower Q3 is disconnected from the input by its series diode 41. As the voltage rises from the output of the adjustable tap of the follower potentiometer 35 approaching 90 volts in which this voltage rise will be approaching 45 volts at terminal point 40, the transistor Q1 will switch into conduction when the voltage from terminal 40 is conducted through the emitter followers of Q3 and Q1 raising the terminal point 10 to 44 volts. As soon as Q1 begins conduction Q2 will be cut off by virtue of the coupling from the collector of transistor Q1 through capacitor 23 to the base of transistor Q2. Accordingly, the trigger circuit will trigger to produce a voltage on output 30 higher than that of 21 under one conductive condition and a voltage lower on output 30 than the reference voltage on the conductor 21 under another conductive condition as the servo motor drives the adjustable tap from one of its limits to the other. That is, as the potentiometer 35 is driven from its low voltage of 10 volts to its high voltage of 90 volts and back in periodic cycles the voltage at terminal 40 will attempt to vary from 5 volts to 45 volts but for the limit established in this example of 6 volts and 44 volts. In this manner the scan limiting circuit will produce an output on the conductor 30 to the differential servo amplifier controlling the servo motor 32 to drive radar tuners, antennas, or other devices, in accordance with oscillations in forward and reverse directions as limited by the upper and lower limit control circuit as adjusted by the taps of the potentiometers 47 and 50. As the upper limit control voltages are reduced the servo motor will drive in forward and reverse oscillations over the potentiometer in a narrower scan; for example, if the upper limit control 47 is set at 40 volts and the lower limit control 50 is set at 10 volts the terminal 40 will vary from 40 volts to 10 volts whereas the adjustable tap will vary from 80 to 20 volts. The scan limits accordingly can be adjusted in their amplitude to be increased or decreased in accordance with the requirements of driving the radar tuners or antenna which the follower potentiometer 35 will provide as a sample voltage output to control the trigger circuit.

While many modifications and changes may be made in the constructional details and features of this invention to adapt same for other obvious applications by changing the values of the elements or the voltages as illustrated and described herein to accomplish similar results, I desire to be limited in the spirit of my invention only by the scope of the appended claims.

I claim:

1. A variable hysteresis trigger circuit comprising:
   a Schmitt trigger circuit having two inputs and an output;
   a differential servo amplifier and a servomotor coupled to drive the servomotor in forward and reverse directions in accordance with the differential output of said servo amplifier, said servo amplifier having one input coupled to a reference voltage and another input coupled to the output of said Schmitt trigger circuit;
   a follower potentiometer having the adjustable tap thereof driven by said servomotor;
   a transistor emitter follower coupling the adjustable tap of said potentiometer with one input of said Schmitt trigger circuit; and
   an upper and lower voltage limiting network having a pair of diodes with the anode of one and the cathode of the other coupled in common to said Schmitt trigger circuit other input, the cathode of said one diode coupled to an upper limit voltage and the anode of the other coupled to a lower limit voltage whereby said Schmitt trigger circuit will trigger to produce a voltage over its output higher than said reference voltage to drive said follower potentiometer in one direction until the upper voltage limit is reached at which time said Schmitt trigger circuit will trigger to produce a voltage over its output lower than said reference voltage to drive said potentiometer in the other direction until the low voltage limit is reached.

2. A variable hysteresis trigger circuit comprising:
   a pair of electron emission devices, each having a first conductor electrode coupled through a load resistance to one pole of a voltage source, a second conduction electrode coupled in common through a load resistance to the other pole of said voltage source, and a control electrode;
   a servo motor driven potentiometer adjustable tap, said tap being coupled through a follower element to the control electrode of one of said pair of electron emission devices;
   an upper and lower voltage limiting network coupled to said control electrode of the other of said pair of electron emission devices; and
   a differential servo amplifier coupled to control the rotative direction of said servo motor and having two inputs, one input coupled to the first conduction electrode of said one of said pair of electron emission devices and the other input being coupled to a reference voltage whereby the servo motor driven potentiometer adjustable tap voltage output is compared in said trigger circuit to the upper and lower voltage limits which, when reached, will reverse the driving rotation of said servo motor to produce a forward and reverse driving operation of said servo motor.

3. A variable hysteresis trigger circuit as set forth in claim 2 wherein
   said pair of electron emission devices consist of a pair of transistors in which said first conduction electrode is a collector electrode, said second conduction electrode is an emitter electrode, and said control electrode is a base electrode.

4. A variable hysteresis trigger circuit as set forth in claim 3 wherein
   said upper and lower voltage limiting network includes a pair of diodes with the anode of one and the cathode of the other coupled in common as the input to the base electrode of said other of said pair of transistors, the cathode of said one diode being coupled to the adjustable tap of an upper voltage limit potentiometer and the anode of said other diode being coupled to the adjustable tap of a lower voltage limit potentiometer.

5. A variable hysteresis trigger circuit as set forth in claim 4 wherein
   said follower element is a transistor emitter follower having its base and emitter coupling said adjustable tap of said servo motor driven potentiometer and the base of said one of the pair of transistors.

6. A variable hysteresis trigger circuit comprising:
   a pair of NPN transistors coupled in the manner of a Schmitt trigger circuit having a first input coupled to the base of one trnasistor, a second input coupled to the base of the other transistor, and an output coupled to the collector of said one transistor;
   an NPN transistor emitter follower having a base input and an emitter coupled through a diode to said first input of said trigger circuit;
   a follower potentiometer having an adjustable tap coupled to said base input of said emitter follower, the terminals of said follower potentiometer resistance being connected across a voltage;
   a servo motor mechanically coupled to drive said adjustable tap of said follower potentiometer;
   a differential servo amplifier having an output coupled to said servo motor to control same in forward and reverse directions, one input coupled to said output of said trigger circuit, and a second input coupled to a reference voltage; and
   an upper and lower voltage limiting network including two diodes having the anode of one and the cathode of the other coupled in common to said second input of said trigger circuit, the cathode of said one diode being coupled to the adjustable tap of an upper voltage limit potentiometer and the anode of said other diode being coupled to the adjustable tap of a lower voltage limit potentiometer whereby said trigger circuit will alternately produce a voltage on its output higher than said reference voltage and a voltage on its output lower than said reference voltage as said adjustable tap on said follower potentiometer is driven by said servo motor to produce a voltage to said first input of said trigger circuit equaling respectively the upper voltage limit and the lower voltage limit of said upper and lower voltage limiting network applied to said second input of said trigger circuit.

7. A variable hysteresis trigger circuit as set forth in claim 6 wherein
   said coupling of said adjustable tap of said follower potentiometer to said base input of said emitter follower is through a voltage divider.

8. A variable hysteresis trigger circuit as set forth in claim 7 wherein
   said upper and lower voltage limiting network and upper and lower voltage limit potentiometers have the resistance elements thereof coupled in parallel across a direct current voltage source.

9. A variable hysteresis trigger circuit as set forth in claim 8 wherein
said emitter follower base is coupled through a Zener diode in the high resistance direction in series with a diode in the low resistance direction to said second input of said trigger circuit to prevent the emitter follower input voltage from rising more than a predetermined amount above the upper voltage limit of said upper and lower voltage limiting network.

References Cited
UNITED STATES PATENTS

| | | | |
|---|---|---|---|
| 2,456,573 | 12/1948 | White et al. | 318—18 |
| 3,068,388 | 12/1962 | Burski | 318—29 |
| 3,110,851 | 11/1963 | Plogstedt et al. | 318—29 X |
| 3,166,699 | 1/1965 | Dalzell | 318—30 |
| 2,846,630 | 8/1958 | Boyle et al. | |

BENJAMIN DOBECK, *Primary Examiner.*